United States Patent [19]

Suwa

[11] Patent Number: 5,507,216
[45] Date of Patent: Apr. 16, 1996

[54] TANDEM TYPE VACUUM BOOSTER

[75] Inventor: Toshiyuki Suwa, Nagano, Japan

[73] Assignee: Nissin Kogyo Co., Ltd., Nagano, Japan

[21] Appl. No.: 316,489

[22] Filed: Oct. 3, 1994

[30] Foreign Application Priority Data

Oct. 5, 1993 [JP] Japan ................. 5-054016 U

[51] Int. Cl.$^6$ ....................................... F15B 9/10
[52] U.S. Cl. .................... 91/369.1; 91/376 R; 92/48
[58] Field of Search ................ 91/369.1, 369.2, 91/369.3, 376 R, 533; 92/48, 49, 96, 98 R

[56] References Cited

U.S. PATENT DOCUMENTS

| 4,813,337 | 3/1989 | Endo ................................. 91/369.2 |
| 4,987,824 | 1/1991 | Shinohara et al. ................ 91/369.1 |
| 5,056,413 | 10/1991 | Kaub ................................. 91/369.3 |
| 5,367,941 | 11/1994 | Gautier et al. .................... 91/369.2 |

FOREIGN PATENT DOCUMENTS 3510844 10/1986 Germany ................ 91/369.1

4-17415 4/1992 Japan.
2211905 7/1989 United Kingdom.

*Primary Examiner*—Hoang Nguyen
*Attorney, Agent, or Firm*—Whitham, Curtis, Whitham & McGinn

[57] ABSTRACT

In a tandem type vacuum booster a coupling cylinder extending from the inner peripheral edge of a front booster piston is coupled to a piston boss with bolts, and the inner peripheral bead of the front diaphragm is held inserted between the front booster piston and the piston boss in which the coupling cylinder is increased in rigidity so that seal members are prevented from being adversely affected in seal characteristic by the deformation of the coupling cylinder, a reinforcing cylinder of synthetic resin which has an inward flange at the front end is fitted in the coupling cylinder extending from the inner peripheral edge of a front booster piston, and the reinforcing cylinder is held on the bottom plate of the coupling cylinder by the elastic force of a return coil spring applied to the inward flange. It is unnecessary to provide a particular mounting member for the reinforcing cylinder.

17 Claims, 3 Drawing Sheets

TANDEM TYPE VACUUM BOOSTER

BACKGROUND OF THE INVENTION

The present invention relates to a tandem type vacuum booster which operates a brake master cylinder or a clutch master cylinder on a motor vehicle in a boost mode, and more particularly to an improvement of a tandem type vacuum booster in which a piston boss integral with a cylindrical valve case which accommodates a control valve is fastened with screw members to the bottom plate of a coupling cylinder which is extended from the inner peripheral edge of a front booster piston and set in the front end portion of the piston boss, the inner peripheral bead of a front diaphragm which is laid on the rear surface of the front booster piston is inserted between the booster piston and the piston boss, a return coil spring is elastically set between the front end wall of a booster shell and the piston boss, to urge the piston boss backwardly, and an output rod is coupled to the piston boss in such a manner that the output rod is protruded forwardly of the piston boss.

A tandem type vacuum booster of this type has been well known in the background art, for instance, by Examined Japanese Utility Model Publication No. Hei. 4-17415.

If, in the tandem type vacuum booster, a coupling cylinder extended from the inner peripheral edge of a front booster piston is low in rigidity, then the coupling cylinder may be deformed during boost operation. The deformation of the coupling cylinder, adversely affecting various components, may lower the air-tightness of sealing members such as the inner peripheral bead of the front diaphragm.

Hence, in the conventional tandem type vacuum booster, the front booster piston and the coupling cylinder are made of a thick steel plate so that the coupling cylinder is sufficiently high in rigidity. However, the use of the thick steel plate for formation of the front booster piston results in an undesirable increase in weight of the booster.

SUMMARY OF THE INVENTION

An object of the present invention is to provide a tandem type vacuum booster simple in construction in which a coupling cylinder is effectively increased in rigidity, thereby to avoid an undesirable increase in weight of the booster.

In order to achieve the foregoing object of the present invention, a first aspect of the present invention resides in that, the tandem type vacuum booster provides a booster shell, a front booster piston reciprocating back and forth in the booster shell, a piston boss engaging with the front booster piston, a coupling cylinder extended from an inner peripheral edge of the front booster piston to be set in a front end portion of the piston boss, the coupling cylinder including a bottom plate for fastening the piston boss, a return coil spring elastically set between a front end wall of the booster shell and the piston boss, for urging the piston boss backwardly, and a reinforcing cylinder fitted in the coupling cylinder integral with the front booster piston, in which the reinforcing cylinder includes an inward flange at a front end thereof, the inward flange being pushed by a rear end of the return coil spring to hold the reinforcing cylinder on the bottom plate of the coupling cylinder at a predetermined contact position.

A second aspect of the present invention resides in that in the tandem type vacuum booster according to the first embodiment, an annular protrusion is formed on the inward flange, the annular protrusion being engaged with the rear end portion of the return coil spring.

A third aspect of the present invention resides in that, in the tandem type vacuum booster according to the first and second embodiments, the inward flange has an inner peripheral surface which supports the output rod at the middle.

DETAILED DESCRIPTION OF THE PREFERRED EMBODIMENTS

Figure 1:
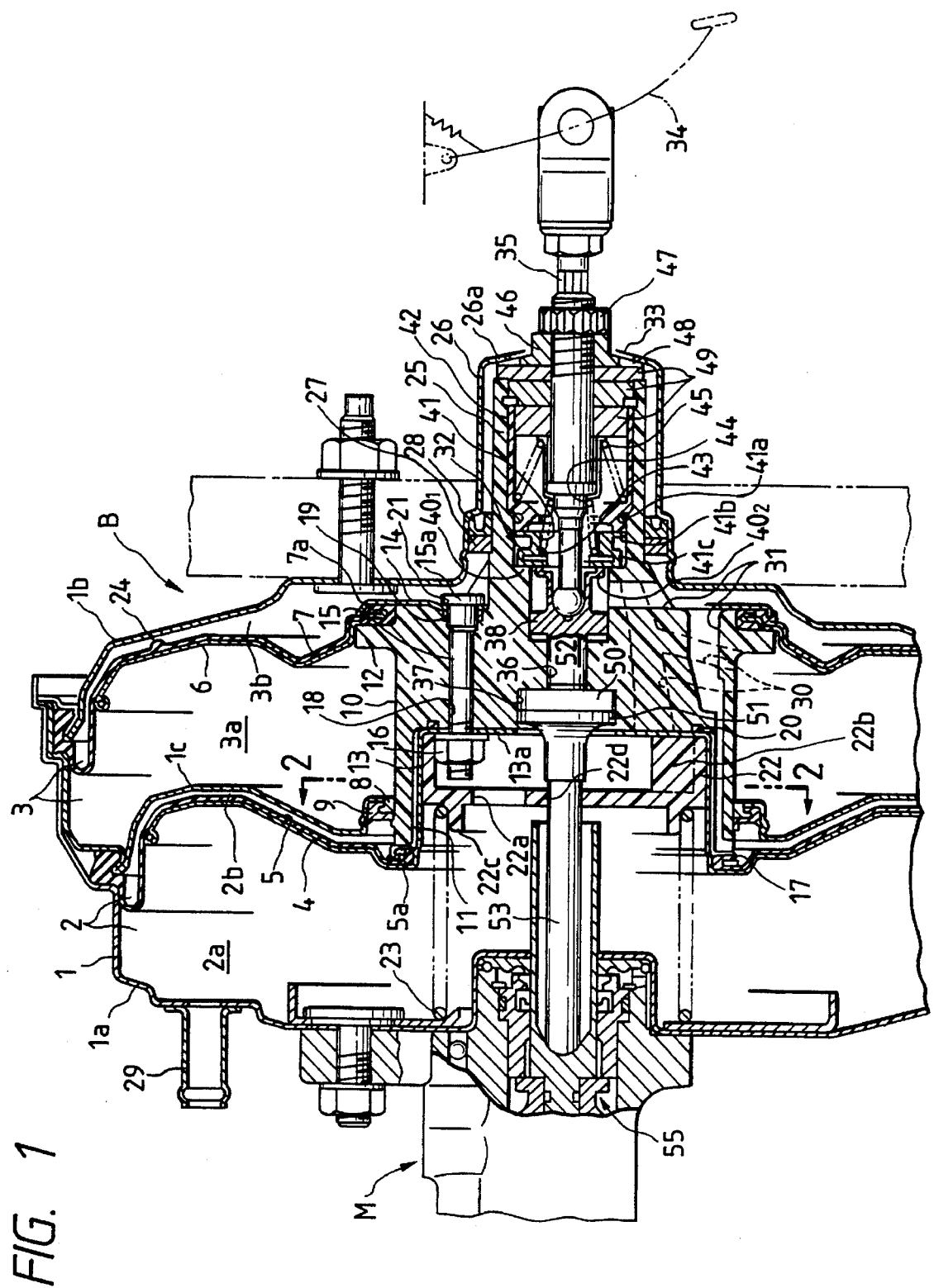
FIG. 1 is a sectional side elevation showing an example of a tandem type vacuum booster which constitutes a first embodiment of the present invention.

Preferred embodiments of the present invention will be described with reference to the accompanying drawings.

A first embodiment of the present invention will be described with reference to FIGS. 1 and 2.

A brake master cylinder M, which is operated by a tandem type vacuum booster B, is mounted on the front surface of the booster shell 1 of the booster B. The booster shell 1 provides: a pair of shell halves, namely, front and rear shell halves 1a and 1b which are combined with each other through their confronted edges, thus defining a chamber; and a partition board 1c set between the front and rear shell halves 1a and 1b to divide the chamber into a front shell chamber 2 and a rear shell chamber 3. The rear shell half 1b is supported by the vehicle body (not shown).

The front shell chamber 2 is divided into a front vacuum chamber 2a and a front operating chamber 2b located behind the former 2a by a front booster piston 4 which is reciprocated back and forth in the shell chamber, and by a front diaphragm 5 which is bonded to the rear surface of the front booster piston 4 and held between the front shell half 1a and the partition board 1c. Similarly, the rear shell chamber 3 is divided into a rear vacuum chamber 3a and a rear operating chamber 3b located behind the former 3a by a rear booster piston 6 which is reciprocated back and forth in the rear shell chamber, and by a rear diaphragm 7 which is bonded to the rear surface of the rear booster piston 6 and fixedly held between the two shell halves 1a and 1b together with the partition board 1c.

The front and rear booster pistons 4 and 6 are annular and made of a steel plate. Those booster pistons 4 and 6 are coupled to both end portions of a piston boss 10 of synthetic resin, which is slidably supported through a bushing 8 and a seal member 9 on the partition board 1c, as follows:

A round recess 11 is formed in the front end face of the piston boss 10 to the depth which is about a half of the length of the piston boss 10. The piston boss 10 has a flange 12 on the outer cylindrical surface which is located slightly away from the rear end. A coupling cylinder 13 with an bottom plate 13a, which is extended from the inner peripheral edge of the front booster piston 4, is fitted in the round recess 11. A retaining plate 14 is set on the rear end face of the piston boss 10, to hold the rear booster piston 6 with the aid of the aforementioned flange 12. The retaining plate 14, the piston boss 10, and the bottom plate 13a are secured to one another with a plurality of through-bolts (three through-bolts in the case of FIG. 1) 15 and nuts 16 engaged with the former 15.

The inner peripheral bead 5a of the front diaphragm 5, and an annular retainer 17 are set between the front booster piston 4 and the front end face of the piston boss 10 in such a manner that the retainer 17 covers the outer cylindrical surface and the rear surface of the inner peripheral bead 5a. The inner peripheral bead 7a of the rear diaphragm 7 is set between the flange 12 and the retaining plate 14 in such a manner that it covers the inner peripheral end of the rear booster piston 6. Hence, the front booster piston 4, the rear booster piston 6, and the piston boss 10 are combined into one unit, and the inner peripheral beads 5a and 7a of the diaphragms 5 and 7 are fixedly secured to the booster pistons 4 and 6, respectively.

The piston boss 10 has bolt holes 18 into which the through-bolts 15 are inserted. Seal members 19 are fitted in the bolt holes 18, to prevent the communication between the front vacuum chamber 2a and the rear operating chamber 3b. A seal member 20 is set between the aforementioned bottom plate 13a and the piston boss 10 in such a manner that it surrounds the through-bolts 15, which prevents the communication between first and second forked ports 30 and 31 (described later) through the gap between the bottom plate 13a and the piston boss 10.

The through-bolts 15 have rectangular heads 15a, which are set on the side of the rear operating chamber 3b. More specifically, the rectangular heads 15a are engaged with recesses 21 formed in the retaining plate 14 which are similar in configuration to the rectangular heads 15a, so that the rotation of the rectangular heads 15a and accordingly the through-bolts 15 is prevented, Hence, on the side of the front vacuum chamber 2a, the nuts 16 can be positively engaged with the through-bolts 15.

A reinforcing cylinder 22 of synthetic resin for reinforcing the coupling cylinder 13 is fitted in the coupling cylinder 13 in such a manner that it surrounds the nuts 16. The length of the reinforcing cylinder 22 is longer than half of the length of the coupling cylinder 13. The rear end of the reinforcing cylinder 22 is abutted against the bottom plate 13a of the coupling cylinder 13. Furthermore, the reinforcing cylinder 22 has an annular inward flange 22a which is extended radially inwardly from the front edge in such a manner as to cover the front end portions of the through-bolts 15 and the nuts 16. A plurality of ribs 22b are formed on the inner cylindrical surface of the reinforcing cylinder 22 in such a manner that they are extended radially and are coupled to the rear surface of the inward flange 22a. The inward flange 22a and the ribs 22b assure the rigidity of the reinforcing cylinder 22.

An annular protrusion 22c is formed on the front surface of the inward flange 22. The annular protrusion 22c is press-fitted in the rear end portion of a return coil spring 23, which is elastically set between the front shell half 1a and the inward flange 22a. The piston boss 10, and accordingly the booster pistons 4 and 6 are kept urged backwardly by the elastic force of the return coil spring 23. The backward movement of the booster pistons 4 and 6 is limited by a number of protrusions 24 formed on the rear surface of the rear diaphragm 6; that is, the backward movement is allowed until the protrusions 24 abut against the rear wall of the booster shell 1.

A cylindrical valve case 25 is protruded from the rear end of the piston boss 10. The cylindrical valve case 25 is slidably supported through a bushing 27 and a seal member 28 by a rear elongated cylinder 26 which is extended from the rear end of the rear shell half 1b.

The front vacuum chamber 2a is connected through a negative pressure introducing pipe 29 to a negative pressure source (such as the inside of the suction manifold of an internal combustion engine), and is communicated with the rear vacuum chamber 3a through a first forked port 30 formed in the piston boss 10. The front and rear operating chambers 2b and 3b are communicated with each other through a second forked port 31 formed in the piston boss 10. Furthermore, the front and rear operating chambers 2b and 3b are communicated alternately with the front and rear vacuum chambers 2a and 3a and an air introducing hole 33 formed in the bottom plate 26a of the rear elongated cylinder 26 by means of a control valve 32.

An input rod 35 coupled to a brake pedal 34, and the aforementioned control valve 32 which is controlled by the input rod 35, are provided in the cylindrical valve case 35 as follows: That is, a valve piston 38 is slidably engaged with the front portion of the cylindrical valve case 25, and the front end portion of the input rod 35 extended through the air introducing hole 33 is rockingly coupled to with the valve piston 38. A first valve seat $40_1$, which is annular, is protruded from the inner cylindrical surface of the cylindrical valve case 25 in such a manner that it surrounds a second valve seat $40_2$, which is also annular and formed on the rear end face of the valve piston 38. A valve body 41 cooperating with those valve seats $40_1$ and $40_2$ is provided inside the cylindrical valve case 25. The valve body 41 is made of rubber, and it is in the form of a cylinder with both ends opened. The rear end portion of the valve body 41, namely, a base end portion 41a is held in close contact with the inner cylindrical surface of the cylindrical valve case 25 with the aid of a holding cylinder 42 fitted in the latter 25. The valve body 41 provides: a flexible portion 41b which is relatively thin and is bent radially inwardly; and a valve portion 41c which is relatively thick and integral with the front end of the flexible portion 41b. The valve portion 41c is arranged confronted with the aforementioned first and second valve seats $40_1$ and $40_2$.

The valve portion 41c is moved back and forth as the flexible portion 41b deforms. More specifically, when moved forwardly, the valve portion 41c is set on the first and second valve seats $40_1$ and $40_2$; and when moved backwardly, it is received by the front end of the holding cylinder 42.

An annular reinforcing plate 43 is buried in the valve portion 41c, and a valve spring 44 is elastically set between the reinforcing plate 43 and the input rod 35, to urge the valve portion 41c towards the first and second valve seats $40_1$ and $40_2$.

Both one end of the first forked port 30, and one end of the second forked port 31 are opened in the inner surface of the cylindrical valve case 25. More specifically, the one end of the first forked port 30 is opened outside the first valve seat $40_1$, and the one end of the second forked portion 31 is opened inside the same valve seat $40_1$.

The inside of the second valve seat $40_2$ is communicated with the air introducing hole 33 through the valve body 41 and the holding cylinder 42.

The valve body 41, the valve spring 44, and the first and second valve seats $40_1$ and $40_2$ form the control valve 32.

A return spring 45 is elastically set between the input rod 35 and the holding cylinder 42, to urge the input rod 35 towards its rear limit position.

The rear limit position of the input rod 35 is determined as follows: When a stopper plate 46, which is threadably mounted on the input rod 35 so that its position can be adjusted freely, abuts against the inner surface of the bottom plate 26a of the rear elongated cylinder 26, the input rod 35 is at the rear limit position. Since the stopper plate 46 can be shifted on the input rod 35 by turning it, the rear limit position of the input rod 35 may be shifted back and forth by turning the stopper plate 46. After the rear limit position has been determined, the stopper plate 46 is fixed by tightening a lock nut 47 which is also threadably engaged with the input rod 35. The stopper plate 46 has an air vent hole 48 so that it may not close the air introducing hole 33.

In order to filter the air taken in the cylindrical valve case 25 through the air introducing hole 33, air filters 49 are provided inside the cylindrical valve case 25 in such a manner that they are mounted on the input rod 35. The air filters 49 are flexible to the extent that they do not obstruct the relative displacement of the input rod 35 and the cylindrical valve case 25.

The piston boss 10 has a large cylinder hole 37 and a small cylinder hole 36. More specifically, the large cylinder hole 37 is opened in the front end face of the piston boss 10 at the center, and one end of the small cylinder hole 36 is opened to the large cylinder hole 37 and the other end to the cylindrical valve case 25. A reaction piston 51, which is integral with the above-described valve piston 38 or abuts against it, is slidably engaged with the small cylinder hole 36. An elastic piston 50 and an output piston 51 are slidable engaged with the large cylinder hole 37 in such a manner that the elastic piston 50 is confronted with the reaction piston 52 and the output piston 51 is set on the front surface of the elastic piston 50. In order to prevent the output piston 51 from coming off the large cylinder hole 37, the inner peripheral edge of the above-described bottom plate 13a is extended over the opening of the large cylinder hole 37.

An output rod 53 is extended from the front surface of the output piston 51, and it is coupled to the piston 55 of the aforementioned brake master cylinder M.

The operation of the above-described embodiment will be described.

First, when the vacuum booster B is at rest, the input rod 35 is at the rear limit position as shown in FIG. 1, and the control valve 32 is in the neutral state that, with the valve portion 41c set on the first and second valve seats 40$_1$ and 40$_2$, the front and rear operating chambers 2b and 3b are not communicated with the vacuum chambers 2a and 3a and the air introducing hole 33. Hence, the negative pressure of the negative pressure source, being supplied through the negative pressure introducing pipe 29, is stored in the vacuum chambers 2a and 3a, and the negative pressure, being suitably decreased by the outside air, is held in the operating chambers 2b and 3b. Thus, weak forwarding forces are applied to the front and rear booster pistons 4 and 6 which are due to the difference in pressure between the front vacuum chamber 2a and the front operating chamber 2b and the difference in pressure between the rear vacuum chamber 3a and the rear operating chamber 3b. The forwarding forces being in balance with the elastic force of the return coil spring 23, the booster pistons 4 and 6 are stopped slightly ahead of their rear limit positions.

It is assumed that, in order to brake the vehicle, the brake pedal 34 is depressed (operated) to move the input rod 35 and the valve piston 38 forwardly. In this case, initially the booster pistons 4 and 6 are not in operation, and therefore the second valve seat 40$_2$ leaves the valve portion 41c immediately, so that the operating chambers 2b and 3b are communicated with the air introducing hole 33. As a result, the air is quickly introduced into the operating chambers 2b and 3b through the air introducing hole 33 and the second valve seat 40$_2$ and the second forked port 31. Hence, the pressure in the operating chambers 2b and 3b is made higher than that in the vacuum chambers 2a and 3a. The pressure differences thus formed provide strong forwarding forces to cause the booster pistons 4 and 6 to move forwardly against the elastic force of the return coil spring 23, so that the piston 55 of the brake master cylinder M is moved forwardly through the output rod 53. Thus, when the brake pedal 34 is depressed, the brake master cylinder M is operated without delay; that is, the vehicle is braked quickly.

In the braking operation, the valve piston 38 is moved forwardly together with the input rod 35 to abut against the elastic piston 50 through the reaction piston 52. The elastic piston 50, receiving the operating reactions of the booster pistons 4 and 6, is expanded (deformed) towards the small cylinder hole 36, thus applying part of the reactions to the reaction piston 52. That force is fed back to the side of the brake pedal 34 through the valve piston 38 and the input rod 35. The above-described effects of reaction allows the operator to feel the output of the output rod 53; i.e., the magnitude of the braking force.

As the force of depression of the brake pedal 34 increases; that is, as the input to the input rod 35 increases, the output of the output rod 53 is increased. When the output exceeds a predetermined boost limit, the front surface of the valve piston 38 is abutted against the piston boss 10, so that the aforementioned input is transmitted to the output rod 53 through the valve piston 38, the piston boss 10, the elastic piston 50 and the output piston 51. Thus, the output rod 53 outputs the sum of the forward force due to the pressure differences of the booster pistons 4 and 6 and the forward force due to the input.

When the brake pedal 34 is released, the input rod 35 is moved backwardly together with the valve piston 38 by the elastic force of the return spring 45, while the second valve seat 40$_2$ is engaged with the valve portion 41c of the valve body 41, and the valve body 41 is greatly moved away from the first valve seat 40$_1$. As a result, the operating chambers 2b and 3b are communicated with the vacuum chambers 2a and 3a, and the pressure differences of the booster pistons 4 and 6 are eliminated. Hence, the booster pistons 4 and 6 are moved backwardly by the elastic force of the return coil spring 23, thus releasing the brake master cylinder M.

When the input rod 35 is returned until the stopper plate 46 abuts against the bottom plate 26a of the elongated cylinder 26; that is, when the input rod 35 is moved backwardly to the rear limit position, the rear booster piston 6 is returned until the protrusions 24 of the rear diaphragm 7 abut against the rear wall of the booster shell 1; that is, it is returned to the rear limit position. Hence, the first valve seat 40$_1$ is engaged with the valve body 41c, while the latter 41c is slightly moved away from the second valve seat 40$_2$. As a result, the air is introduced into the operating chambers 2b and 3b, thus providing pressure differences. When the booster pistons 4 and 6 are slightly moved forwardly by the pressure differences, the gap between the second valve seat 40$_2$ and the valve portion 41c is eliminated, and the control valve 32 is placed in the neutral state again. Thus, the negative pressure decreased by the air is maintained in the operating chambers 2b and 3b, so that the vacuum booster B is held at rest as shown in FIG. 1.

In the tandem type vacuum booster B, the reinforcing cylinder 22 of synthetic resin is fitted in the coupling cylinder 13 extended from the inner peripheral edge of the front booster piston 4, and the inward flange 22a is extended radially inwardly from the front edge of the reinforcing cylinder 22 to reinforce the latter 22. Hence, the use of the reinforcing cylinder 22 which is light and high in rigidity, effectively increases the rigidity of the coupling cylinder 13, and can prevent the deformation of the coupling cylinder 13 during boost operation of the front booster piston 4. Hence, the difficulty is eliminated that the inner peripheral bead 5a of the front diaphragm 5 and the seal member 20 are adversely affected in seal characteristic by the deformation of the coupling cylinder 13.

The inward flange 22a of the reinforcing cylinder 22 supports the rear end portion of the return coil spring 23. Hence, the reinforcing cylinder 22 is held at the position where it is abutted against the bottom plate 13a of the coupling cylinder 13, by the elastic force of the return coil spring 23. Therefore, it is unnecessary to provide a particular mounting member for the reinforcing cylinder 22.

Furthermore, the rear end portion of the return coil spring 23 is press-fitted on the annular protrusion 22c formed on the front surface of the inward flange 22a. Hence, the return coil spring 23 is prevented from coming off the reinforcing cylinder 22 before the booster shell 1 is assembled.

Figure 4:
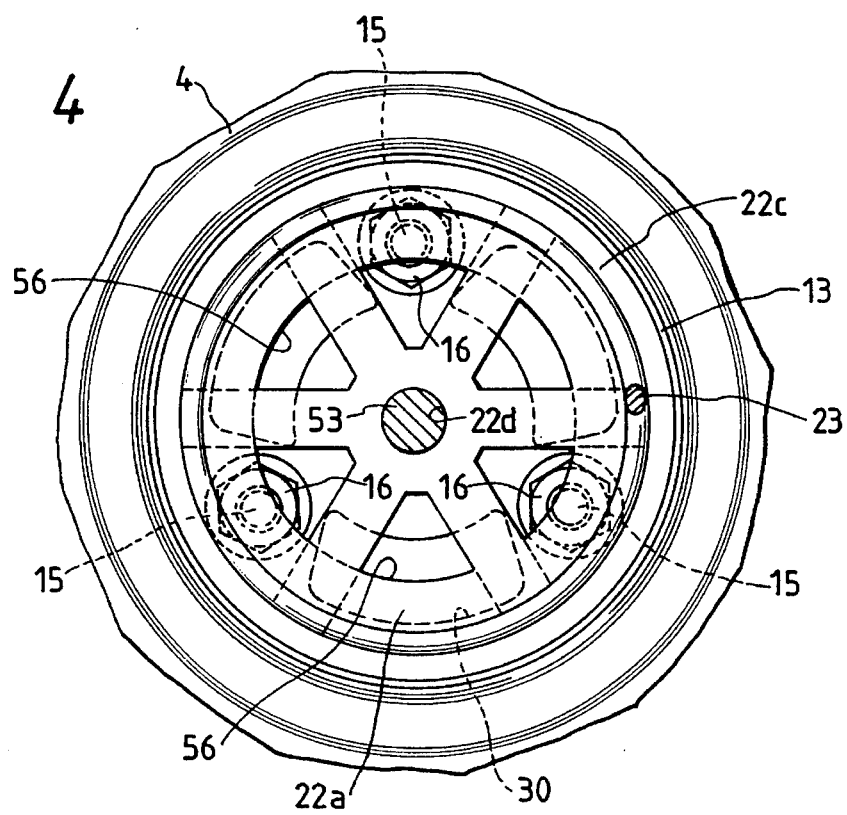
FIG. 4 is a sectional view taken along line 4—4 in FIG. 3.
Figure 3:
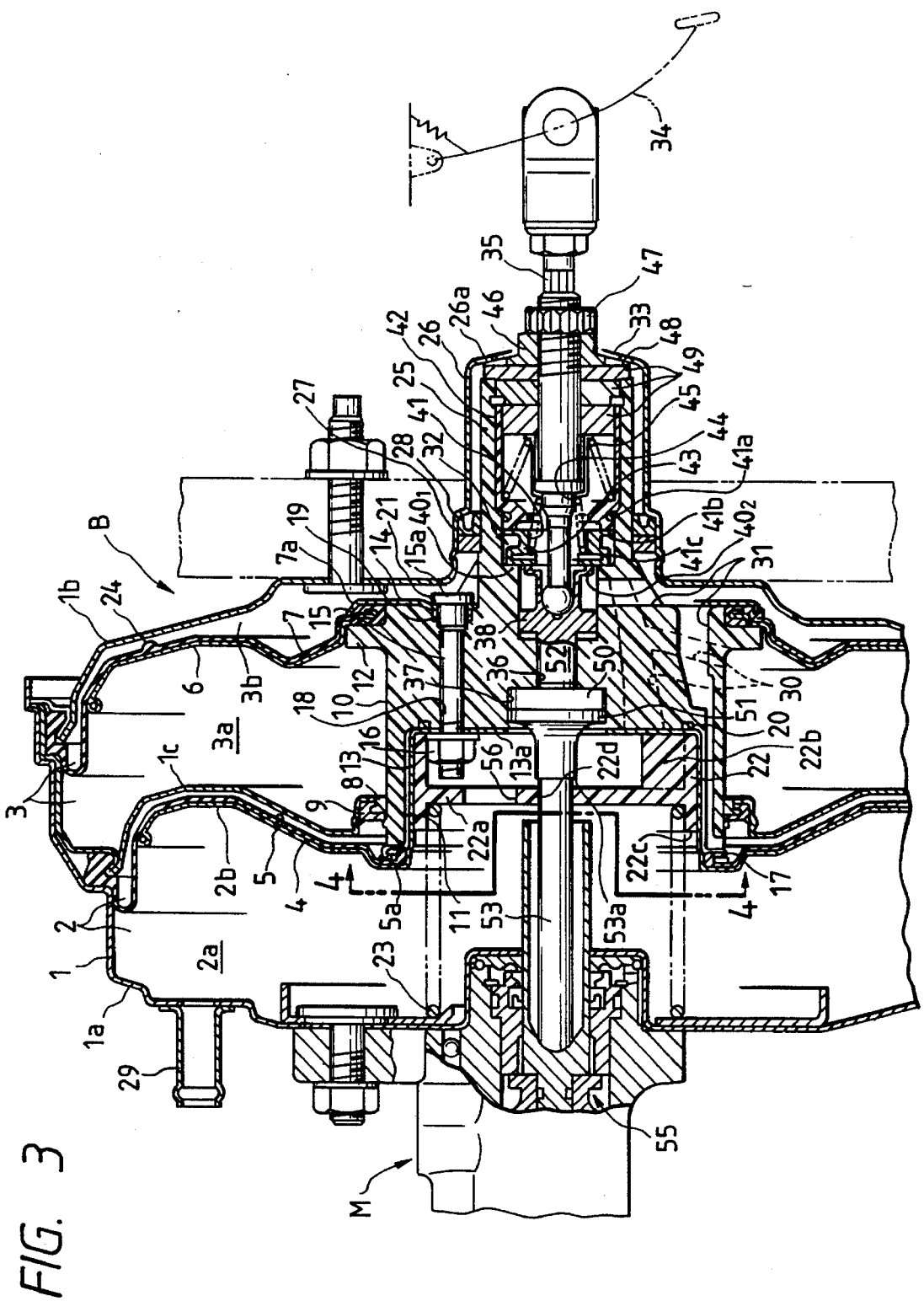
FIG. 3 is a sectional side elevation showing another example of the tandem type vacuum booster, which constitutes a second embodiment of the present invention.

FIGS. 3 and 4 shows a second embodiment of the present invention.

In the second embodiment, an annular protrusion 22c is formed as a prolongation of the front end portion of the reinforcing cylinder 22, and the rear end portion of the return coil spring 23 is press-fitted in the annular protrusion 22c. In this case, the effective length of the reinforcing cylinder 22 is increased as much as the height of the annular protrusion 22c, which further increases the rigidity of the coupling cylinder 13.

The inward flange 22a of the reinforcing cylinder is so shaped that its inner peripheral surface 22d supports the output rod 53 at the middle. The inward flange 22a suppresses the vibration of the output rod 53, so that the latter 53 is suitably held abutted against the piston 55 of the brake master cylinder M, thus being able to transmit the thrust correctly. In this case, in order that the inward flange 22a may not obstruct the communication between the first forked port 30 and the front vacuum chamber 2a, a plurality of through-holes 56 are formed in the inward flange 22a.

In the second embodiment, the inner peripheral edge of the bottom plate 13a of the coupling cylinder 13 is not extended towards the large cylinder hole 37. Therefore, in order to prevent the output piston 51 from coming off the large cylinder hole 37, the output rod 53 has a shoulder 53a at the middle, which is set adjacent to the rear inner peripheral edge of the inward flange 22a. In this case, after the coupling cylinder 13 is fixedly secured to the piston boss 10 with the through-bolts 15 and the nuts 16, the output piston 51 can be fitted in the large cylinder hole 37 of the piston boss 10. That is, the nuts 16 can be tightened without being obstructed by the output rod 53.

Figure 2:
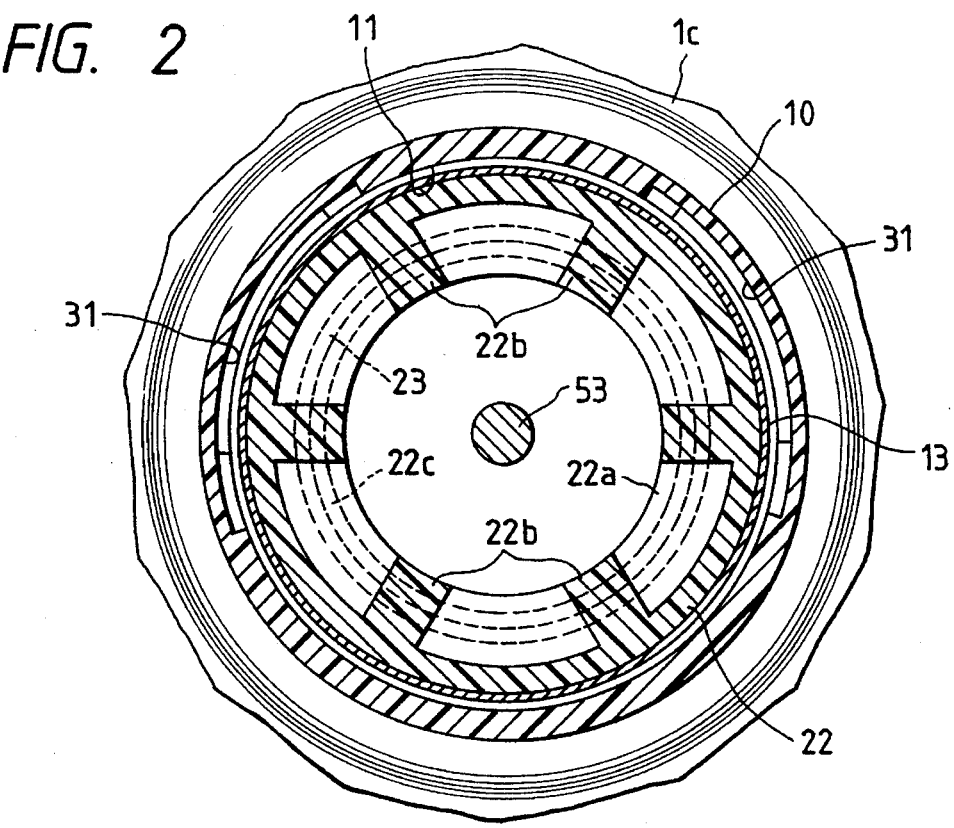
FIG. 2 is a sectional view taken along line 2—2 in FIG. 1.

The other arrangements are equal to those in the first embodiment, and accordingly in FIGS. 3 and 4, parts corresponding functionally to those which have been described with reference to FIGS. 1 and 2 are therefore designated by the same reference numerals or characters.

While there has been described in connection with the preferred embodiments of the present invention, it will be obvious to those skilled in the art that various changes and modifications may be made therein without departing from the invention.

As described above, in the tandem type vacuum booster, according to the present invention, the reinforcing cylinder of synthetic resin is fitted in the coupling cylinder integral with the front booster piston, to increase the rigidity of the coupling cylinder, and the reinforcing cylinder has the inward flange at the front end which reinforces the reinforcing cylinder, and which, being pushed by the rear end of the return coil spring, is held on the bottom plate of the coupling cylinder. Hence, the coupling cylinder is increased in rigidity by the reinforcing cylinder which is light and high in rigidity; and the sealing members such as the inner peripheral bead of the front diaphragm are air-tight without a great increase of the weight. Furthermore, the reinforcing cylinder is held in position by the elastic force of the return coil spring; that is, it is unnecessary to provide a particular mounting member for it.

In the tandem type vacuum booster, the annular protrusion is formed on the inward flange, and it is engaged with the rear end portion of the return coil spring. Hence, the return coil spring is prevented from coming off the reinforcing cylinder before the booster shell is assembled; that is, the tandem type vacuum booster can be assembled with high efficiency.

Furthermore, in the tandem type vacuum booster, the inward flange is so modified that it has the inner peripheral surface which supports the output rod at the middle. Hence, the output rod is prevented from vibration; that is, it is held stable at all times.

What is claimed is:

1. A tandem type vacuum booster comprising:

a booster shell having a front end;

a front booster piston reciprocating back and forth in said booster shell;

a piston boss for engaging said front booster piston;

a coupling cylinder extending from an inner peripheral edge of said front booster piston and positioned in a front end portion of said piston boss, said coupling cylinder including a bottom plate for coupling with said piston boss;

a return coil spring elastically set between a front end wall of said booster shell and said piston boss, for urging said piston boss in a direction away from said front end of said booster shell; and a reinforcing cylinder comprising synthetic resin and being positioned in said coupling cylinder, said coupling cylinder integrally formed with said front booster piston, wherein said reinforcing cylinder includes an inward flange at a front end thereof for reinforcing said reinforcing cylinder and for holding said return coil spring, said inward flange being biased by a rear end of said return coil spring for holding said reinforcing cylinder on said bottom plate of said coupling cylinder at a predetermined contact position, said reinforcing cylinder being held solely by said return coil spring.

2. A tandem type vacuum booster comprising:

a booster shell having a front end;

a front booster piston reciprocating back and forth in said booster shell;

a piston boss for engaging said front booster piston;

a coupling cylinder extending from an inner peripheral edge of said front booster piston and positioned in a front end portion of said piston boss, said coupling cylinder including a bottom plate for coupling with said piston boss;

a return coil spring elastically set between a front end wall of said booster shell and said piston boss, for urging said piston boss in a direction away from said front end of said booster shell; and a reinforcing cylinder positioned in said coupling cylinder, said coupling cylinder integrally formed with said front booster piston, wherein said reinforcing cylinder includes an inward flange at a front end thereof, said inward flange being biased by a rear end of said return coil spring for holding said reinforcing cylinder on said bottom plate of said coupling cylinder at a predetermined contact position, wherein said booster further comprises a plurality of ribs positioned on an inner cylindrical surface of said reinforcing cylinder, wherein said ribs extend radially from said inward flange, said ribs being coupled to a rear surface of said inward flange.

3. A tandem type vacuum booster comprising:

a booster shell having a front end;

a front booster piston reciprocating back and forth in said booster shell;

a piston boss for engaging said front booster piston;

a coupling cylinder extending from an inner peripheral edge of said front booster piston and positioned in a front end portion of said piston boss, said coupling cylinder including a bottom plate for coupling with said piston boss;

a return coil spring elastically set between a front end wall of said booster shell and said piston boss, for urging said piston boss in a direction away from said front end of said booster shell; and a reinforcing cylinder positioned in said coupling cylinder, said coupling cylinder integrally formed with said front booster piston, wherein said reinforcing cylinder includes an inward flange at a front end thereof, said inward flange being biased by a rear end of said return coil spring for holding said reinforcing cylinder on said bottom plate of said coupling cylinder at a predetermined contact position, wherein said inward flange includes an annular protrusion, said annular protrusion for engaging the rear end of said return coil spring.

4. A tandem type vacuum booster comprising:

a booster shell having a front end;

a front booster piston reciprocating back and forth in said booster shell;

a piston boss for engaging said front booster piston;

a coupling cylinder extending from an inner peripheral edge of said front booster piston and positioned in a front end portion of said piston boss, said coupling cylinder including a bottom plate for coupling with said piston boss;

a return coil spring elastically set between a front end wall of said booster shell and said piston boss, for urging said piston boss in a direction away from said front end of said booster shell; and a reinforcing cylinder positioned in said coupling cylinder, said coupling cylinder integrally formed with said front booster piston, wherein said reinforcing cylinder includes an inward flange at a front end thereof, said inward flange being biased by a rear end of said return coil spring for holding said reinforcing cylinder on said bottom plate of said coupling cylinder at a predetermined contact position, said booster further comprises an annular protrusion comprising a prolongation of the front end of said reinforcing cylinder, said annular protrusion being rigidly attached to the rear end of said return coil spring on an inner cylindrical surface thereof.

5. The tandem type vacuum booster of claim 1, further comprising a front diaphragm positioned on a rear surface of said from booster piston, said front diaphragm including an inner peripheral bead positioned between said front booster piston and said piston boss.

6. The tandem type vacuum booster of claim 1, further comprising an output rod coupled to said piston boss, said output rod protruding from said piston boss in a direction toward said front end.

7. A tandem type vacuum booster comprising:

a booster shell having a front end;

a front booster piston reciprocating back and forth in said booster shell;

a piston boss for engaging said front booster piston;

a coupling cylinder extending from an inner peripheral edge of said front booster piston and positioned in a front end portion of said piston boss, said coupling cylinder including a bottom plate for coupling with said piston boss;

a return coil spring elastically set between a front end wall of said booster shell and said piston boss, for urging said piston boss in a direction away from said front end of said booster shell; and a reinforcing cylinder positioned in said coupling cylinder, said coupling cylinder integrally formed with said front booster piston, wherein said reinforcing cylinder includes an inward flange at a front end thereof, said inward flange being biased by a rear end of said return coil spring for holding said reinforcing cylinder on said bottom plate of said coupling cylinder at a predetermined contact position, said booster further comprising an output rod coupled to said piston boss, said output rod protruding from said piston boss in a direction toward said front end, wherein said inward flange includes an inner peripheral surface for supporting said output rod at a middle portion of said output rod.

8. The tandem type vacuum booster of claim 7, wherein said inward flange includes a plurality of holes formed therein.

9. The tandem type vacuum booster of claim 1, wherein said piston boss is integrally formed with a cylindrical valve case for accommodating a control valve.

10. The tandem type vacuum booster of claim 1, further comprising connecting means for connecting said piston boss to said bottom plate, wherein said reinforcing cylinder is positioned so as to surround said connecting means.

11. A vacuum booster comprising:

a booster shell having a front end;

a front booster piston reciprocating back and forth in said booster shell;

a piston boss coupled to said front booster piston;

a first cylinder extending from an edge of said front booster piston positioned in a front end portion of said piston boss, said first cylinder including a plate for coupling with said piston boss;

means for connecting said piston boss to said plate;

a return coil spring for urging said piston boss in a direction away from said front end; and a second cylinder positioned in said first cylinder, wherein said second cylinder includes an inward flange at a front end thereof for reinforcing said second cylinder and for holding said return coil spring, said second cylinder being positioned so as to surround said connecting means; and second cylinder being held in said first cylinder solely by said return coil spring.

12. The vacuum booster of claim 11, wherein said return coil spring is in contact with said inward flange and said return coil spring urging said inward flange against said plate.

13. A vacuum booster comprising:

a booster shell having a front end;

a front booster piston reciprocating back and forth in said booster shell;

a piston boss coupled to said front booster piston;

a first cylinder extending from an edge of said front booster piston positioned in a front end portion of said piston boss, said first cylinder including a plate for coupling with said piston boss;

means for connecting said piston boss to said plate;

a spring for urging said piston boss in a direction away from said front end;

a second cylinder positioned in said first cylinder, wherein said second cylinder is positioned so as to surround said connecting means; and retaining means for retaining said second cylinder in a predetermined position on said plate, wherein said retaining means is separately formed from said connecting means, said second cylinder includes an inward flange at a front end thereof, said retaining means comprises a rear end of said spring being in contact with said inward flange and said rear end of said spring urging said inward flange against said plate, a plurality of ribs positioned on an inner cylindrical surface of said second cylinder, wherein said ribs extend radially from said inward flange.

14. The vacuum booster of claim 13, wherein said ribs are formed on a rear surface of said inward flange.

15. A vacuum booster comprising:

a booster shell having a front end;

a front booster piston reciprocating back and forth in said booster shell;

a piston boss coupled to said front booster piston;

a first cylinder extending from an edge of said front booster piston positioned in a front end portion of said piston boss, said first cylinder including a plate for coupling with said piston boss;

means for connecting said piston boss to said plate;

a spring for urging said piston boss in a direction away from said front end;

a second cylinder positioned in said first cylinder, wherein said second cylinder is positioned so as to surround said connecting means; and an annular protrusion including a prolongation of the front end of said second cylinder.

16. The vacuum booster of claim 15, wherein said annular protrusion is rigidly attached to an inner cylindrical surface of a rear end of said spring.

17. The vacuum booster of claim 11, wherein said second cylinder is securedly positioned by an elastic force of said spring.

* * * * *